United States Patent [19]
Rogers, Jr.

[11] 3,983,890
[45] Oct. 5, 1976

[54] ROLL OVER VALVE CONSTRUCTION AND METHOD OF MAKING THE SAME

[75] Inventor: Arden D. Rogers, Jr., Knoxville, Tenn.

[73] Assignee: Robertshaw Controls Company, Richmond, Va.

[22] Filed: June 9, 1975

[21] Appl. No.: 585,239

[52] U.S. Cl. ............................ 137/38; 123/198 DB; 180/104
[51] Int. Cl.² ........................................ F16K 17/36
[58] Field of Search ..................... 137/38, 39, 43; 123/198 DB; 180/104

[56] References Cited
UNITED STATES PATENTS

| | | | |
|---|---|---|---|
| 2,933,095 | 4/1960 | Rumsey | 137/38 |
| 3,407,827 | 10/1968 | Follett | 137/39 |
| 3,807,423 | 4/1974 | Engel | 137/38 |
| 3,910,301 | 10/1975 | Kuss | 137/38 |

Primary Examiner—Robert G. Nilson
Attorney, Agent, or Firm—Candor, Candor & Tassone

[57] ABSTRACT

A roll over valve construction having a housing provided with an inlet and an outlet separated by a valve seat. A pair of balls are carried by the housing so that one thereof can move to close the valve seat when the valve construction is rotated from its normal position to a certain other rotational position thereof, the pair of balls normally being held away from the valve seat by gravity when the valve construction is between the normal position thereof and the certain position thereof. A larger ball member is carried by the housing for preventing the first pair of balls from moving to close the valve seat when the valve construction is between the normal position and the certain position thereof even though the valve construction is being subjected to shocks, impacts, bouncing, etc. that would normally cause one of the pair of balls to move to close the valve seat.

16 Claims, 10 Drawing Figures

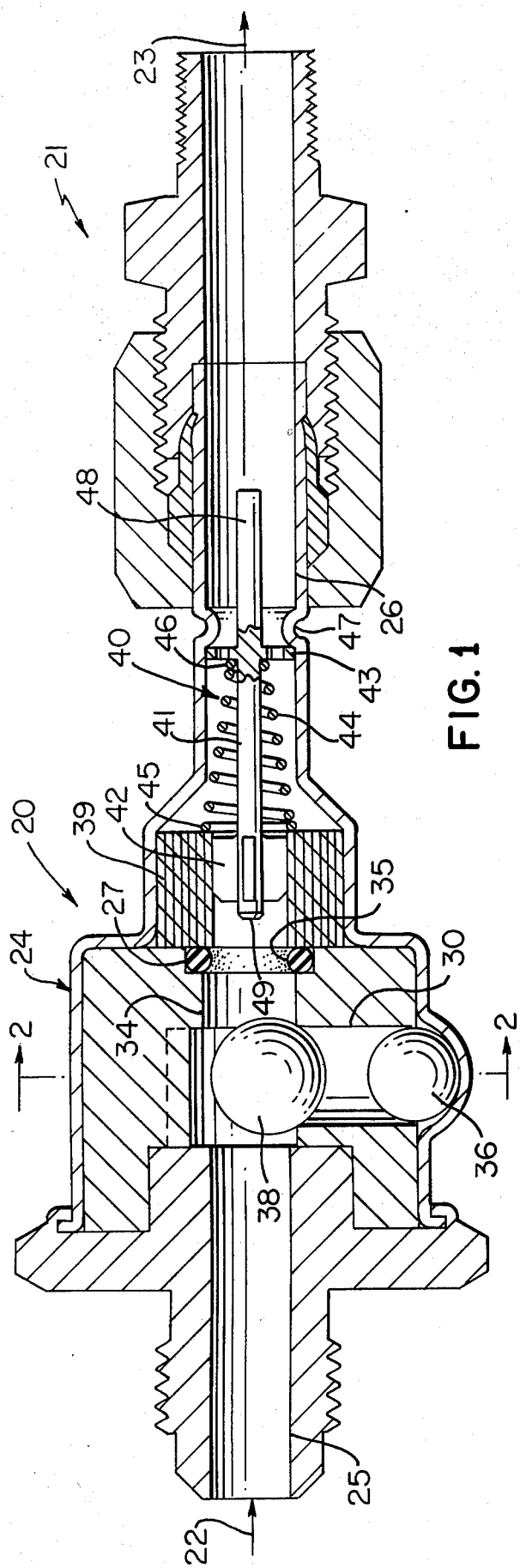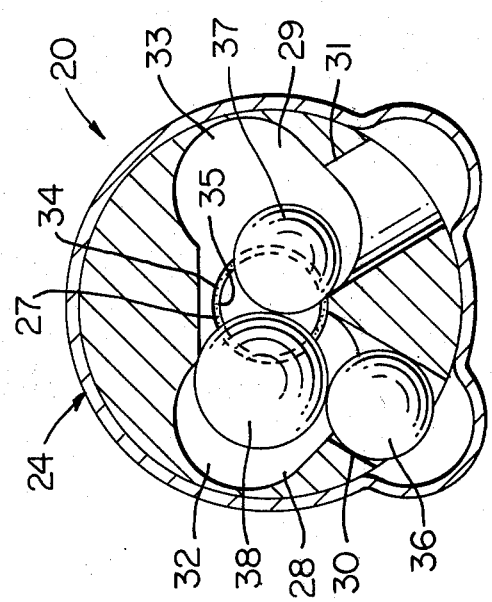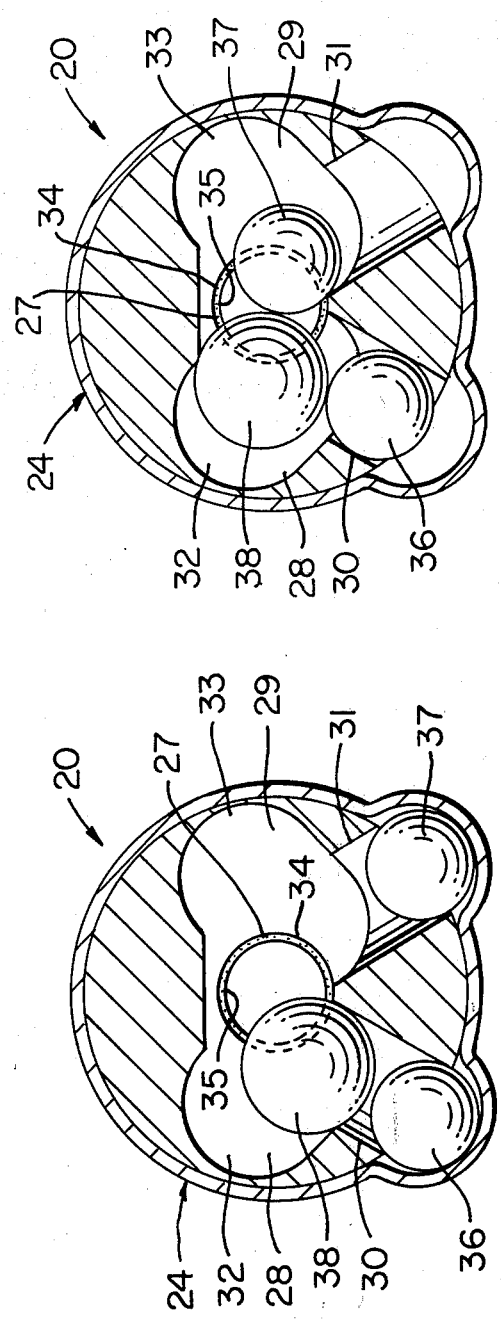

ROLL OVER VALVE CONSTRUCTION AND METHOD OF MAKING THE SAME

This invention relates to a roll over valve construction and method of making the same as well as relates to a vehicle supply line utilizing such a roll over valve construction.

It is well known that a requirement is being made in the vehicle manufacturing industry that some means be provided for automatically disconnecting the fuel source of a vehicle from the engine thereof when the vehicle turns over or rolls over through a certain arc from its normal horizontal position so as to minimize the chances for a fuel fire.

Accordingly, it is a feature of this invention to provide a roll over valve construction which can be utilized in a fuel line of a vehicle between the fuel source thereof and the engine thereof to automatically close that fuel line when the valve construction is rotated through a certain arc in either direction from its normal horizontal position.

It is another feature of this invention to provide such a roll over valve construction which will tend to prevent accidental closing of such fuel line unless the roll over valve construction is actually rotated or turned in either direction from its normal horizontal position to a certain rotational position thereof.

In particular, one embodiment of this invention provides a roll over valve construction having a housing means provided with an inlet and an outlet separated by a valve seat means. Ball means is carried by the housing means for moving to close the valve seat means when the valve construction is rotated from its normal position to a certain other position and is normally held away from said valve seat by gravity when the valve construction is between the normal position thereof and said certain position thereof. Other means are carried by the housing means for preventing the ball means from moving to close the valve seat means when the valve construction is between the normal position thereof and the certain position thereof even though the valve construction is being subjected to shocks, impacts, bouncing, etc. that would normally cause the ball means to close the valve seat means.

Accordingly, it is an object of this invention to provide an improved roll over valve construction having one or more of the novel features set forth above or hereinafter shown or described.

Another object of this invention is to provide an improved method of making such a roll over valve construction or the like, the method of this invention having one or more of the novel features set forth above or hereinafter shown or described.

Another object of this invention is to provide an improved fuel line system for a vehicle wherein the fuel line includes the roll over valve construction of this invention.

Other objects, uses and advantages of this invention are apparent from a reading of this description which proceeds with reference to the accompanying drawings forming a part thereof and wherein:

FIG. 1 is a cross-sectional view illustrating one embodiment of the roll over valve construction of this invention disposed in a vehicle fuel supply line.

FIG. 2 is a cross-sectional view taken on line 2—2 of FIG. 1.

FIG. 3 is a view similar to FIG. 2 and illustrates the action of the roll over valve construction during bouncing thereof.

Figure 6:
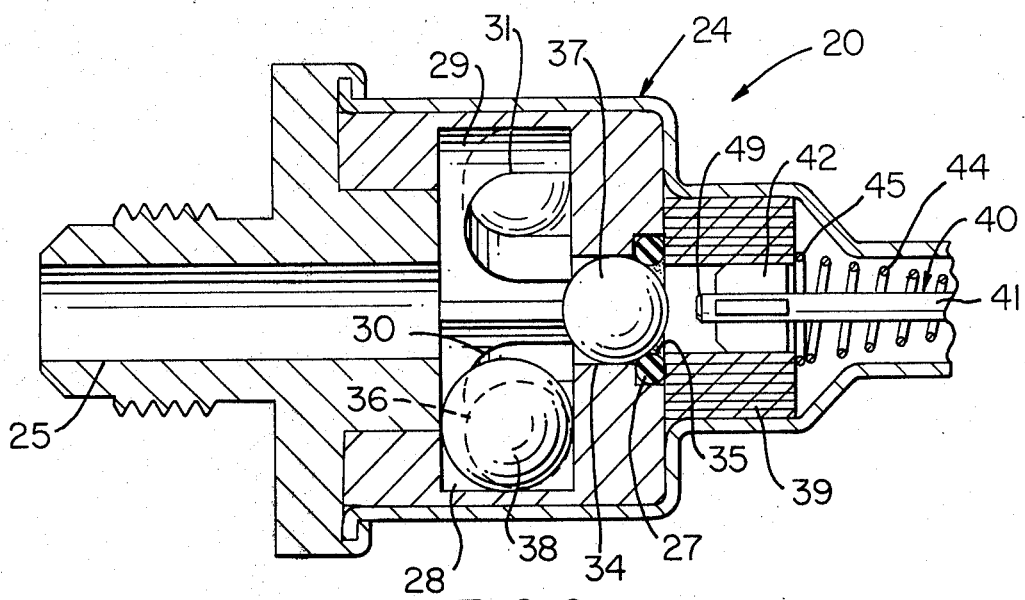
FIG. 6 is a fragmentary, cross-sectional view taken on line 6—6 of FIG. 5.

While the various features of this invention are hereinafter described and illustrated as being particularly adapted to provide a roll over valve construction for a fuel line of a land vehicle, it is to be understood that the various features of this invention can be utilized singly or in any combination thereof to provide a valve construction for other devices as desired.

Therefore, this invention is not to be limited to only the embodiments illustrated in the drawings, because the drawings are merely utilized to illustrate one of the wide variety of uses of this invention.

Referring now to FIGS. 1, 2 and 3, one embodiment of the improved roll over valve construction of this invention is generally indicated by the reference numeral 20 and is illustrated as being disposed in a land vehicle supply line that is generally indicated by the reference numeral 21 and comprising a source of fuel 22 being directed by the fuel supply line 21 to the vehicle engine 23 in a conventional manner.

With the roll over valve construction 20 of this invention disposed in the fuel line 21, should the vehicle containing the fuel line 21 roll over from a normal horizontal position thereof through an arc of a certain amount, such as 60°, in either rotational direction, the roll over valve construction 20 will close the fuel line 21 between the source 22 and the engine 23 will be apparent hereinafter for the reasons previously set forth.

The roll over valve construction 20 includes a housing means that is generally indicated by the reference numeral 24 and which has an inlet means 25 and an outlet means 26 separated by a resilient valve seat means 27 whereby the inlet 25 is adapted to be interconnected to the fuel source side of the fuel line 21 and the outlet 26 is adapted to be interconnected to the engine side of the fuel line 21 in the manner illustrated in FIG. 1.

The housing means 24 has a pair of like passages 28 and 29 respectively interconnecting the inlet passage 25 and being angled relative to each other with lower portions 30 and 31 thereof depending from the inlet 25 in a radial manner therefrom when the valve construction 20 is disposed in its normal horizontal position as illustrated in FIGS. 1 and 2. The passages or chambers 28 and 29 respectively have other or upper portions 32 and 33 thereof extending radially upwardly from the inlet 25 as illustrated in FIG. 2 for a purpose hereinafter described.

The transverse passages 28 and 29 of the housing 24 intersect the inlet 25 at a point spaced from the valve seat means 27 so that a portion 34 of the inlet 25 is disposed intermediate the valve seat means 27 and the transverse passages 28 and 39 while having a substantially cylindrical configuration and a diameter slightly larger than the diameter of the opening 35 that passes through the resilient valve seat means 27 for a purpose hereinafter described.

If desired, the resilient valve seat means 27 can comprise a suitable resilient O-ring or the like.

A pair of balls 36 and 37 are respectively disposed in the depending portions 30 and 31 of the passages 28 and 29 as illustrated in FIG. 2 and a larger ball 38 is disposed in the passages 28 and 39 intermediate the balls 36 and 37, the ball 38 being adapted to prevent either one of the balls 36 and 37 from entering the part 34 of the inlet 25 to close the valve seat 27 unless the valve construction 20 is rotated through a certain arc in either direction, which in the embodiment of the valve construction 20 in FIG. 1 in 60° in either direction from the normal horizontal position of the valve construction 20 as illustrated in FIGS. 1 and 2 as will be apparent hereinafter.

The ball 38 has a diameter larger than the diameter of the part 34 of the inlet 25 so that the ball 38 cannot enter the part 34 of the inlet 25 to close against the valve seat 27. However, the diameters of the balls 36 and 37 are such that each ball 36 or 37 can enter the part 34 of the inlet 25 and engage against the resilient valve seat 27 to completely close the same so that no fuel flow can take place between the fuel source 22 and the engine 23 when the valve seat 27 is closed as will be apparent hereinafter.

The balls 36 and 37 of the roll over valve construction 20 are formed of magnetically attracting metallic material whereas the ball 38 is formed of non-magnetically attracting material and an annular, permanent magnet 39 is disposed in the outlet means 26 of the housing means 24 adjacent the valve seat 27 to attract and hold the ball 36 or 37 to the valve seat 27 when the same is permitted to enter the part 34 of the inlet 25 as will be apparent hereinafter.

The valve construction 20 is provided with reset means for unsealing the ball 36 or 37 from the valve seat 27 in opposition to the force of the magnet 39 that tends to hold that ball to the valve seat 27, such reset means being generally indicated by the reference numeral 40 in FIG. 1.

Figure 7:
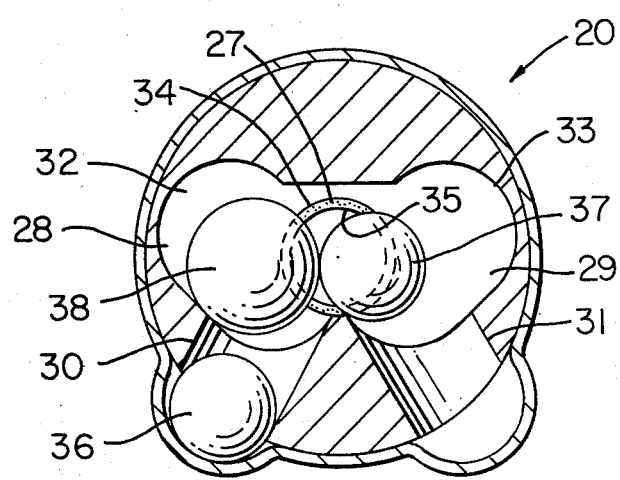
FIG. 7 is a view similar to FIG. 2 and illustrates the resetting action of the roll over valve construction of FIG. 1.

The reset means 40 comprises a plunger means 41 having a plurality of fins 42 disposed in the opening through the permanent magnet 39 to permit axial movement therein and through the valve seat 27 while holding the plunger 41 concentrically therewith. Another disc-like part 43 of the plunger 41 is disposed in the outlet means 26 to also hold the plunger 41 coaxially therewith as illustrated in FIG. 1 while permitting the plunger 41 to be axially movable in the outlet means 26. However, a compression spring 44 is disposed about the plunger 41 and has one end 45 bearing against the permanent magnet 39 while the other end 46 thereof bears against the disc-part 43 to tend to hold the plunger 41 in its unactuated position and against an inward embossment 47 of the housing means 24 as illustrated. However, when the plunger 41 is manually and axially moved to the left in FIG. 1 in opposition to the force of the compression spring 44 by a force being applied to the right-hand end 48 of the plunger 41, the left-hand end 49 of the plunger can be inserted into and through the valve seat 27 to urge the ball 36 or 37 off of the same and out of the part 34 of the inlet 35 as illustrated in FIG. 7 and hereinafter described.

Thus, it can be seen that the roll over valve construction 20 of this invention can be formed of relatively few parts and in a simple manner to operate in a manner now to be described.

With the roll over valve construction 20 of this invention disposed in the fuel line 21 as illustrated in FIGS. 1, 2 and 3, the pair of balls 36 and 37 are normally disposed respectively in the bottoms of the passages 28 and 29 and the larger ball 38 is either to the right or to the left of the part 34 of the inlet 25 as illustrated in FIG. 2 so that complete flow of fuel can pass from the inlet 25 to the outlet 26 through the open valve seat 27 of the fuel line 21 whereby the roll over valve construction 20 does not impede the normal flow of fuel from the fuel source 22 to the engine 23 for normal operation thereof.

However, it is well known that all vehicles are subjected to shocks, impacts, bouncing, etc. that would cause the balls 36 and 37 to move upwardly in the passages 28 and 29 and if it were not for the larger ball 38 of this invention, the ball 36 or 37 could be bounced to the portion 34 of the inlet 25 and be attracted therein by the magnet force of the magnet 39 to close the valve seat 27 and thereby stop the fuel flow through the line 21 during a situation that does not require closing of the fuel line 21 as it is only desired for the fuel line 21 to be closed should the vehicle rotate more than 60° from its normal horizontal position in either rotational direction as would be the case during an accident of the vehicle.

Figure 5:
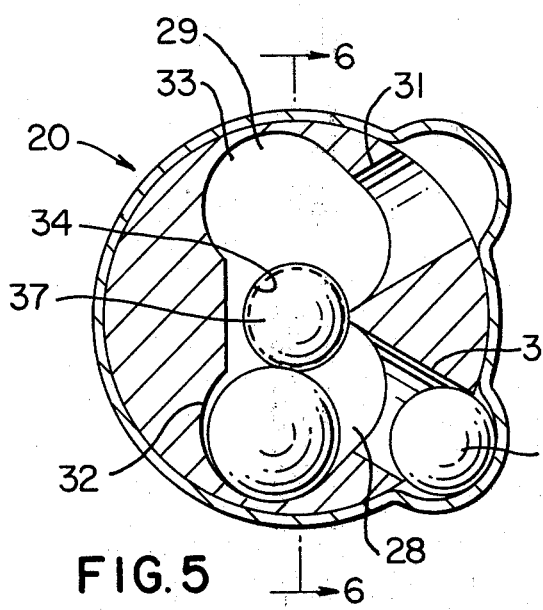
FIG. 5 is a view similar to FIG. 2 and illustrates the roll over valve construction having been rotated to a position thereof which will cause closing of the fuel line.
Figure 4:
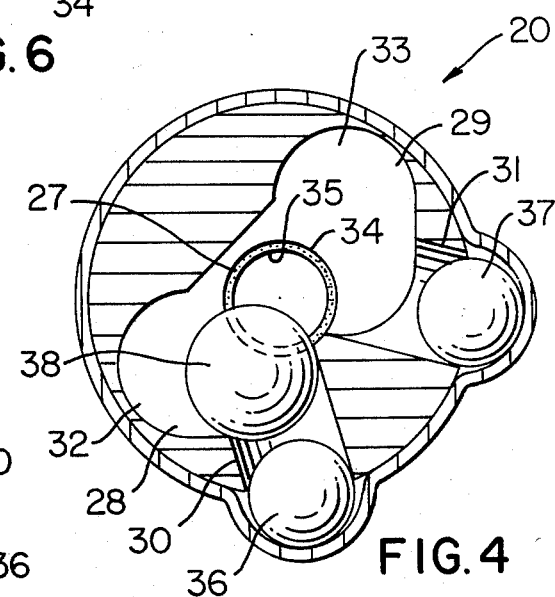
FIG. 4 is a view similar to FIG. 2 and illustrates the roll over valve construction in a rotated position thereof which will not cause closing of the fuel line.

Thus, by providing the larger non-magnetically attracted ball 38 between the smaller balls 36 and 37 in the manner illustrated in FIGS. 2, 3 and 4, it can be seen that the larger ball 38 prevents either ball 36 or 37 from reaching the part 34 of the inlet 25 during shocks, impacts, bouncing and partial rotation of the vehicle (such as on sharply banked turns and the like), etc. as it is only when the larger ball 38 falls to the outer extremety of either part 32 and 33 of the passages 28 and 29 in the manner illustrated in FIG. 5, that the larger ball 38 permits the ball 36 or 37 to fall or roll by gravity to the part 34 of the inlet 25 and be drawn therein to close the valve seat 27 by the magnetic attraction for that ball 36 or 37 by the permanent magnet 39 as illustrated in FIGS. 5 and 6.

Thus, once the vehicle containing the fuel line 21 has been rotated in a clockwise or counterclockwise direction from its normal horizontal position approximately 60°, which in the example illustrated in FIG. 5 is being rotated in a counterclockwide direction, the larger ball 38 falls or rolls to the bottom of the part 32 of the passage 28 to permit the ball 37 to follow such movement thereof and be aligned with the part 34 of the inlet 25 whereby the ball 37 is drawn into the part 34 of the inlet 25 into sealing relation with the valve seat means 27 by the permanent magnet 39 to completely close the fuel line 21 and maintain the fuel line 21 completely closed even through the vehicle is subsequently returned to its normal horizontal position as would be the case in a complete roll over of the vehicle or several roll overs thereof as the case may be.

Thus, it is believed that the roll over valve construction 20 of this invention will function to completely close the valve seat 27 only when the fuel line 21 containing the same is rotated through an arc in a clockwise or counterclockwise direction from its normal horizontal position approximately 60° and will maintain that valve seat closed position thereafter until the roll over valve construction 20 is reset by the reset means 40 in a manner hereinafter described and that such valve construction 20 will not close the valve seat 27 during normal shocks, impacts, bouncing, etc. of the valve construction 20 or partial rotation of the fuel line 21 between the normal position thereof and the critical 60° position thereof as fully illustrated in FIG. 4.

Once the ball 36 or 37 has been permitted to close the valve seat 27 in the manner illustrated in FIGS. 5 and 6, the manual resetting of the valve construction 20 can take place when the valve construction 20 is disposed back in its normal position and the plunger 41 is axially moved to the left as illustrated in FIG. 1 in opposition to the force of the compression spring 44 to have the end 49 thereof force the ball 37 out of the part 34 of the inlet 25 into the passage 29 whereby the weight of the larger ball 38 will force the same down into the passage 28 so that the same will fall to the bottom of the portion 31 thereof as illustrated in FIG. 7 and FIG. 2.

Therefore, it can be seen that this invention provides an improved roll over valve construction and method of making the same as well as an improved vehicle fuel line utilizing such a valve construction.

While the valve construction 20 has been previously described as having the reset means 40 disposed in the outlet 26 thereof so that the fuel line 21 will have to be opened in order to actuate the plunger 41 thereof for a resetting operaton, it is to be understood that the reset means could be disposed in such a manner that the fuel line 21 need not be taken apart for a resetting operation.

Figure 8:
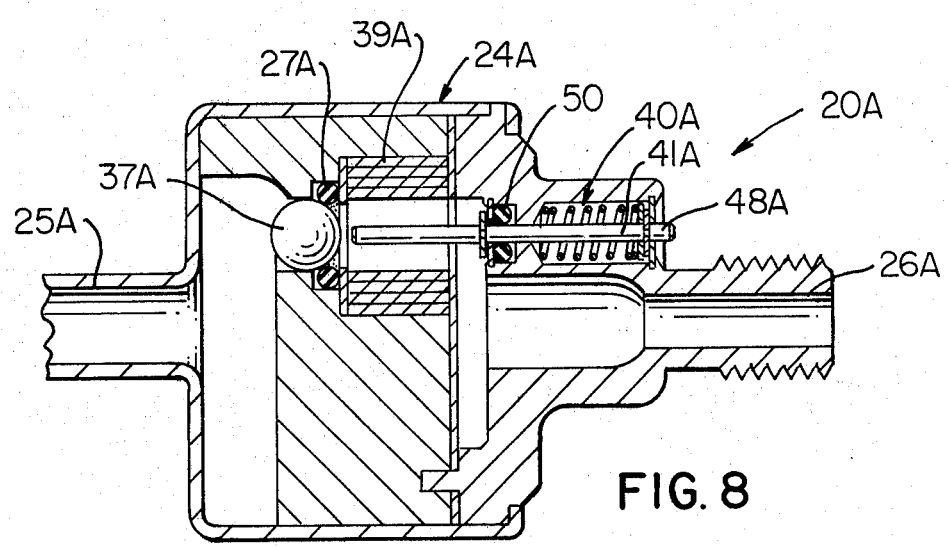
FIG. 8 is a view similar to FIG. 1 and illustrates another embodiment of the roll over valve construction of this invention.

For example, reference is made to FIG. 8 wherein another embodiment of the roll over valve construction of this invention is generally indicated by the reference numeral 20A and parts thereof similar to the valve construction 20 previously described are indicated by like reference numerals followed by the reference letter A.

As illustrated in FIG. 8, the valve seat means 27A of the housing means 24A of the roll over valve construction 20A is disposed in an offset manner relative to the inlet means 25A and the outlet means 26A thereof so that the reset means 40A is disposed parallel to, but spaced from the outlet 26A. In this manner, the right hand end 48A of the plunger 41A extends out of the housing means 24A to be readily accessible to push the ball 37A off of the valve seat 27A in the manner previously described and reset the valve construction 20A, the plunger 41A being sealed by a suitable O-ring seal 50 as illustrated.

Thus, it can be seen that the roll over valve construction 20A is adapted to function in the same manner as the valve construction 20 previously described while having the reset means 40A thereof disposed out of the outlet means 26A thereof to permit the valve construction 20A to be reset without dismanteling the vehicle fuel line containing the same.

While the valve constructions 20 and 20A have been previously described as having a permanent magnet 39 and 39A for attracting magnetically attractible balls to respectively close the resilient valve seat 27 and 27A, it is to be understood that the valve seat may be formed of magnetically attractible material and the valve seat closing balls could be made of magnetic material. Also, while the valve seats 27 and 27A have been described and illustrated as being resilient, the valve seat closing ball itself could be resilient and the valve seat could be non-resilient, if desired.

Figure 9:
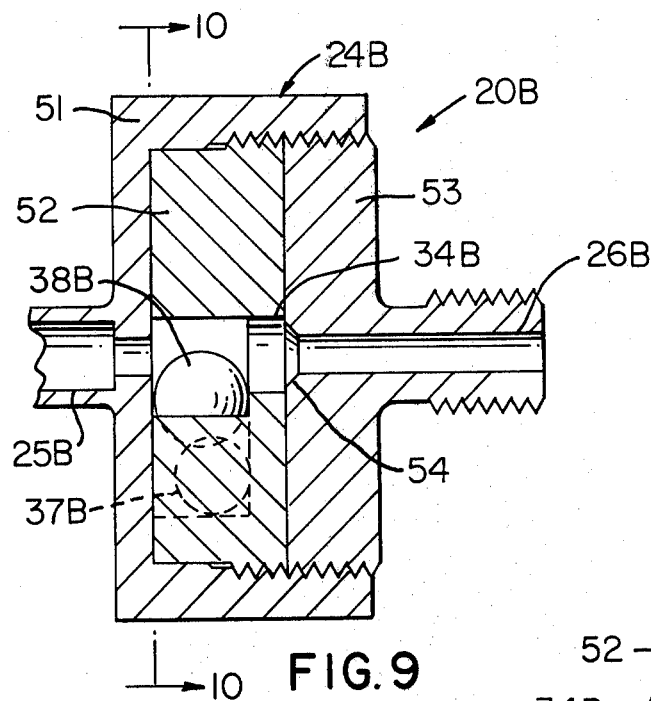
FIG. 9 is a veiw similar to FIG. 8 and illustrates another embodiment of the roll over valve construction of this invention.
Figure 10:
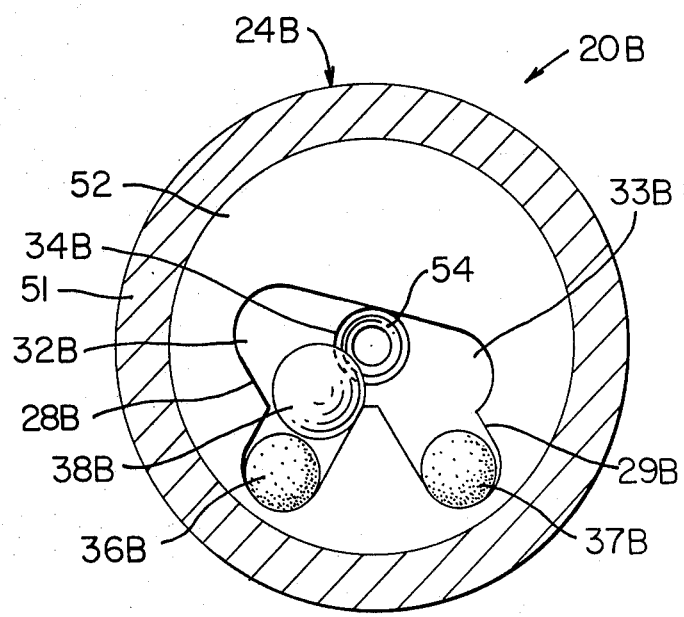
FIG. 10 is a cross-sectional view taken on line 10—10 of FIG. 9.

In particular, another roll over valve construction of this invention is generally indicated by the reference numeral 20B in FIGS. 9 and 10 and parts thereof similar to the valve constructions 20 and 20A previously described are indicated by like reference numerals followed by the reference letter "B".

Referring now to FIGS. 9 and 10, the roll over valve construction 20B comprises the housing means 24B formed of a plurality of parts 51, 52 and 53 suitably secured together in the manner illustrated in FIG. 9 with the housing parts 51 and 52 being formed of non-magnetically attracting metallic material while the housing part 53 is formed of magnetically attracting material and has a frustoconical valve seat 54 leading to the outlet means 26B. The housing part 52 is also so constructed and arranged that the same has the passages 28B and 29B formed thereof with the portions 32B and 33B being formed in a slightly different manner than the parts 32 and 33 of the passages 28 and 29 previously described but operating in the same manner and containing the balls 36B, 37B and 38B.

However, the balls 36B and 37B are formed of magnetic material and are rubber coated. Alternately, the balls 36B and 37B could be formed of any desired material and be rubber coated with rubber material containing magnet material therein.

In any event, the balls 36B and 37B each act as a magnet so that when one of the balls 36B or 37B is aligned with the part 34B of the inlet 25B through a roll over of the valve constructions 24B through an arc of 60° or more, the magnetic ball 36B or 37B attracts itself to the valve seat 54 to seal close the same through its resilient surface as the part 53 that forms the valve seat 54 is formed of magnet attracting material.

While the roll over valve construction 20B is illustrated without resetting means, it is to be understood that a plunger could be inserted through the outlet 26B to push the ball 36B or 37B away from the valve seat 54 in the same manner as the reset means 40 or 40A previously described. Of course, the valve construction 20B can be provided with a permanent reset means 40 or 40A if desired.

Therefore, it can be seen that this invention not only provides improved roll over valve constructions and methods of making the same, but also this invention provides improved vehicle fuel line systems utilizing such roll over valve constructions.

While the forms and methods of this invention now preferred have been described and illustrated as required by the Patent Statute, it is to be understood that other forms and method steps can be utilized and still fall within the scope of the appended claims.

What is claimed is:

1. A roll over valve construction comprising a housing means having an inlet and an outlet separated by a valve seat means, ball means carried by said housing means for moving to close said valve seat means when said valve construction is rotated from its normal position to a certain other position and normally being held away from said valve seat means by gravity when said valve construction is between said normal position and said certain position, and means carried by said housing means for tending to prevent said ball means from moving to close said valve seat means when said valve construction is between said normal position and said certain position even though said valve construction is being subjected to shocks, impacts, bouncing, etc. that would normally cause said ball means to move to close said valve seat means, said means for preventing said ball means from moving to close said valve seat means comprising a ball member, said ball means comprising a pair of balls each of which is adapted to close said valve seat means independent of the other ball of said pair thereof.

2. A roll over valve construction as set forth in claim 1 wherein one of said valve seat means and said ball means comprises a magnet member and the other comprises a magnet attracting member.

3. A roll over valve construction as set forth in claim 2 wherein the magnetic attraction between said ball means and said valve seat means is of sufficient force to maintain said ball means in its closed position with said valve seat means even though said valve construction is subsequently returned from said certain rotational position back to said normal position thereof.

4. A roll over valve construction as set forth in claim 3 and including reset means carried by said housing means for resetting said ball means away from said valve seat means after said valve construction is returned from said certain rotational position back to said normal position thereof.

5. A roll over valve construction as set forth in claim 4 wherein said reset means comprises plunger means movable through said valve seat to push said ball means away from the same.

6. A roll over valve construction as set forth in claim 1 wherein said housing means has a pair of passages respectively interconnnecting substantially radially to said inlet and depending therefrom at an angle relative to each other, said pair of balls respectively being disposed in said pair of passages when said valve construction is between said normal position and said certain position.

7. A roll over valve construction as set forth in claim 6 wherein said ball member is disposed intermediate said pair of balls.

8. A roll over valve construction as set forth in claim 7 wherein said inlet has a portion thereof intermediate said pair of passages and said valve seat means, said ball member being larger than said portion so that the same can not reach said valve seat means, each of said pair of balls being smaller than said portion so that the same can reach said valve seat means to close the same.

9. In a vehicle fuel line between the source of fuel and the engine of said vehicle, the improvement comprising a roll over valve construction in said fuel line and comprising a housing means having an inlet and an outlet separated by a valve seat means, ball means carried by said housing means for moving to close said valve seat means when said valve construction is rotated from its normal position to a certain other position and normally being held away from said valve seat means by gravity when said valve construction is between said normal position and said certain position, and means carried by said housing means for tending to prevent said ball means from moving to close said valve seat means when said valve construction is between said normal position and said certain position even though said valve construction is being subjected to shocks, impacts, bouncing, etc. that would normally cause said ball means to move to close said valve seat means, said means for preventing said ball means from moving to close said valve seat means comprising a ball member, said ball means comprising a pair of balls each of which is adapted to close said valve seat means independent of the other ball of said pair thereof.

10. A vehicle fuel line as set forth in claim 9 wherein one of said valve seat means and said ball means comprises a magnet member and the other comprises a magnet attracting member.

11. A vehicle fuel line as set forth in claim 10 wherein the magnetic attraction between said ball means and said valve seat means is of sufficient force to maintain said ball means in its closed position with said valve seat means even though said valve construction is subsequently returned from said certain rotational position back to said normal position thereof.

12. A vehicle fuel line as set forth in claim 11 and including reset means carried by said housing means for resetting said ball means away from said valve seat means after said valve construction is returned from said certain rotational position back to said normal position thereof.

13. A vehicle fuel line as set forth in claim 12 wherein said reset means comprises plunger means movable through said valve seat to push said ball means away from the same.

14. A vehicle fuel line as set forth in claim 9 wherein said housing means has a pair of passages respectively interconnecting substantially radially to said inlet and depending therefrom at an angle relative to each other, said pair of balls respectively being disposed in said pair of passages when said valve construction is between said normal position and said certain position.

15. A vehicle fuel line as set forth in claim 14 wherein said ball member is disposed intermediate said pair of balls.

16. A vehicle fuel line as set forth in claim 15 wherein said inlet has a portion thereof intermediate said pair of passages and said valve seat means, said ball member being larger than said portion so that the same can not reach said valve seat means, each of said pair of balls being smaller than said portion so that the same can reach said valve seat means to close the same.

* * * * *